United States Patent [19]

Ogawa et al.

[11] 4,396,051

[45] Aug. 2, 1983

[54] PNEUMATIC TIRES

[75] Inventors: Masaki Ogawa, Sayama; Yasushi Hirata, Higashimurayama, both of Japan

[73] Assignee: Bridgestone Tire Co., Ltd., Tokyo, Japan

[21] Appl. No.: 353,274

[22] Filed: Mar. 1, 1982

[30] Foreign Application Priority Data

Mar. 13, 1981 [JP] Japan ................................. 56/36354

[51] Int. Cl.³ .......................... B60C 9/00; B60C 1/00; B60C 69/00; B60C 89/00
[52] U.S. Cl. ............................... 151/203; 152/330 R; 152/DIG. 16; 152/505
[58] Field of Search ................... 152/330 R, 350, 349, 152/203–207, DIG. 16; 524/502, 505, 512, 518, 520, 521, 525, 526; 525/146, 148, 154, 199, 210, 211, 214, 231, 232, 233, 235, 239, 240, 241; 260/726; 428/401, 114

[56] References Cited

U.S. PATENT DOCUMENTS

| | | | |
|---|---|---|---|
| 4,042,742 | 8/1977 | Bergomi | 152/354 R |
| 4,255,296 | 3/1981 | Ogawa et al. | 525/86 |
| 4,328,133 | 5/1982 | Ogawa et al. | 525/146 |

FOREIGN PATENT DOCUMENTS

| | | | |
|---|---|---|---|
| 1480977 | 4/1969 | Fed. Rep. of Germany | 152/330 R |
| 54-132905 | 10/1979 | Japan | 152/330 R |
| 54-132907 | 10/1979 | Japan | 152/353 R |

Primary Examiner—Edward C. Kimlin
Assistant Examiner—F. K. Wine
Attorney, Agent, or Firm—Sughrue, Mion, Zinn, Macpeak & Seas

[57] ABSTRACT

A pneumatic tire having a low air permeability, an improved fatigue resistance and a low fuel consumption is disclosed, which comprises an inner liner made of a vulcanizate of a rubber composition comprising 3–30 parts by weight of micro organic short fibers and 10–100 parts by weight of carbon black on a basis of 100 parts by weight of a rubber blend consisting mainly of butyl rubber and/or halogenated butyl rubber; said micro organic short fiber consisting of an amorphous portion having a glass transition temperature of less than 30° C. or more than 120° C. and a crystal portion having a melting point of not less than 160° C., and having an average length of 0.8–30 μm, an average diameter of 0.02–0.8 μm and a ratio of average length to average diameter of 8–400.

4 Claims, No Drawings

PNEUMATIC TIRES

BACKGROUND OF THE INVENTION

1. Field of the Invention

The present invention relates to pneumatic tires having a low air permeability, an improved fatigue resistance and a low fuel consumption by using an inner liner composed of a rubber composition containing micro organic short fibers.

2. Description of the Prior Art

Lately, energy- and resource-saving is one of most significant problems even in the tire industry. That is, the development of low fuel consumption tires and weight-saving tires is most preferential in addition to the improvement of energy efficiency in the tire works. Under such situations, the following four measures are fundamentally considered to develop so-called low fuel consumption tires having a lower rolling resistance inclusive of weight-saving tires:

(1) Weight-saving;
(2) conversion of each component to low energy-loss material;
(3) conversion of tire structure itself (e.g. conversion from bias structure to radial structure; and
(4) application of a higher internal pressure.

In order to achieve the low fuel consumption and weight-saving of the tires, these four measures should be closely connected with each other without independently considering them.

On the other hand, an inner liner for the tire acts not to permeate air and is closely related to the above four measures.

First of all, it is a matter of course that the gauge of each portion of the tire should be reduced in order to plan the weight-saving of the tire. In this case, the tire tends to reduce the function as a pressure vessel. Therefore, the thickness of the inner liner must be increased or the performance of the inner liner must be improved. However, the increase of the thickness of the inner liner is fundamentally contrary to the weight-saving. For this reason, the air permeability should be further reduced as the inner liner.

Secondly, the application of the higher internal pressure means that a pressure promoting air permeation is naturally raised. Therefore, the air permeability of the inner liner must also be reduced likewise the case of the weight-saving.

Heretofore, butyl series rubbers have been used in the inner liner. Consequently, the energy loss of the inner liner is large. Furthermore, the inner liner is relatively large in quantity on the whole of the tire, so that it is high in the contribution to the energy loss of the tire. Therefore, the reduction of the energy loss in the inner liner comes into significant question.

In other words, the weight-saving and low fuel consumption of the tire are made possible by using an inner liner having low air permeability and energy loss. At present, the following four factors restrict the improvement of performances of the inner liner.

(1) Butyl rubber or halogenated butyl rubber is necessary to blend with the other diene rubber because it is poor in the adhesion to the other diene rubber. (The air permeability is lowest in the butyl rubber or halogenated butyl rubber).

(2) Butyl rubber or halogenated butyl rubber is large in the swelling and shrinking at sheeting process before unvulcanization, hard to shape into a uniform sheet, and easy to fluidize under a small stress. Therefore, in the production of the tire, the resulting inner liner is ununiform in the gauge, so that air permeates through the thinned portion of the inner liner.

(3) Halogenated butyl rubber particularly reacts with an antioxidant at a kneading temperature an under a shearing action in the kneading, so that it cannot be blended with the anitoxidant as in the case of usual rubber compositions. Therefore, when crack is formed on the tire surface and gradually grows in the last stage of the tire running, it makes possible to produce a large crack in the inner liner.

(4) Butyl rubber or halogenated butyl rubber is basically large in the energy loss, so that the decrease of carbon black content or the increase of sulfur content should be taken in order to reduce the energy loss. However, the decrease of carbon black content results in the insufficient reinforcing effect, while the increase of sulfur content results in the lowering of elongation at rupture and hence in the deterioration of resistance to crack growth.

Accordingly, if solutions against these factors can be found, the performances of the inner liner can further be improved, which considerably accelerates the developing speed of low fuel consumption tires. However, there are not yet developed techniques solving these drawbacks up to now.

SUMMARY OF THE INVENTION

It is an object of the present invention to provide low fuel consumption tires which solve the above mentioned drawbacks to improve the performance of the inner liner.

The inventors have made various studies in order to achieve the above object and other objects and found out the followings. First of all, the inner liner only acts not to permeate air, but is not required to keep a pressure and mitigate a shock from tread surface, so that there is no necessity for making the resilience of the inner liner high. As a result, micro organic short fibers can be employed in the rubber composition for the inner liner to decrease the amount of carbon black, and also the resulting rubber sheet is hard to shrink and smooth in its surface. Therefore, in the manufacture of tires, the effective adhesive surface of the inner liner to the rubber composition inside the tire body increases, and also the interdiffusion of polymers is mostly caused near the interface between the inner liner and the tire body due to the decreased amount of carbon black and these polymers are covulcanized, so that the adhesion of the inner liner to the tire body after the vulcanization is good. So, by blending particular micro organic short fibers with a rubber composition consisting mainly of butyl rubber and/or halogenated butyl rubber, the swelling and shrinking at sheeting process before unvulcanization are made smaller and at the same time the fluidity can be suppressed, whereby the gauge of the inner liner after the vulcanization becomes uniform and also the resistance to crack growth, which is peculiar to the micro organic short fiber, can further be improved. That is, it has been found that low fuel consumption tires having improved air permeability and resistance to crack growth can be obtained by using the micro organic short fibers in the inner liner and as a result, the present invention has been accomplished.

According to the present invention, therefore, there is the provision of a pneumatic tire, characterized by forming an inner liner with a vulcanizate of a rubber composition comprising 3 to 30 parts by weight of micro organic short fibers and 10 to 100 parts by weight of carbon black on a basis of 100 parts by weight of a rubber blend consisting mainly of butyl rubber and/or halogenated butyl rubber; said micro organic short fiber consisting of an amorphous portion having a glass transition temperature of less than 30° C. or more than 120° C. and a crystal portion having a melting point of not less than 160° C., and having an average length of 0.8 to 30 μm, an average diameter of 0.02 to 0.8 μm and a ratio of average length to average diameter of 8 to 400.

DETAILED DESCRIPTION OF THE INVENTION

According to the present invention, it is essential that the micro organic short fiber consists of an amorphous portion having a glass transition temperature of less than 30° C. or more than 120° C. and a crystal portion having a melting point of not less than 160° C., and has an average length of 0.8–30 μm, an average diameter of 0.02–0.8 μm and a ratio of average length to average diameter of 8–400. The micro organic short fiber is, for example, made of polyvinylidene chloride, polyvinylidene fluoride, poly-p-tert-butylstyrene, p-chlorostyrene, dichlorostyrene, poly-α-methylstyrene, poly-2-methylstyrene, poly-2,5-dimethylstyrene, polytrimethylstyrene, poly-p-phenylstyrene, poly-o-vinyl benzyl alcohol, poly-p-vinyl benzyl alcohol, isotactic-polypropylene, poly-4-methyl-1-pentene, polyvinylnaphthalene, polyoxymethylene, polybisphenol-A carbonate, 1,4-poly-2,3-dimethyl butadiene or the like. Here, the reason why the glass transition temperature of the amorphous portion is less than 30° C. or more than 120° C. is due to the fact that since the heat generating temperature of the tire under usual use conditions is within a range of about 30° to 120° C., if the amorphous portion of the short fiber has a glass transition temperature corresponding to the above heat generating temperature range, the hysteresis loss of the short fiber becomes larger. Moreover, since the glass transition temperature of rubber is about −50° C., the micro organic short fibers, whose amorphous portion having a glass transition temperature of less than 30° C., are preferably used considering the affinity with rubber.

The reason why the micro organic short fiber has an average length of 0.8–30 μm, an average diameter of 0.02–0.8 μm and a ratio of average length to average diameter of 8–400 is as follows. When the average length is less than 0.8 μm, the resistance to crack growth in the resulting rubber composition is not improved sufficiently, while when the average length exceeds 30 μm, the processability such as kneading by a Banbury mixer or the like considerably lowers. When the average diameter is less than 0.02 μm, the micro organic short fibers are cut at the processing step for kneading, sheeting by roll or the like to be too short, while when the average diameter exceeds 0.8 μm, the stress per the surface area of the short fiber becomes larger, which produces a risk of breaking the adhesive surface to rubber, and as a result the creep resistance and flex resistance of the resulting rubber composition lower largely. Further, when the ratio of average length to average diameter is less than 8, high reinforcing effect, cut resistance and resistance to crack growth, which are natures of the short fiber, considerably lower, while when the ratio exceeds 400, the stress induced in the processing is too large as compared with the strength of the short fiber, which results in the cutting of the short fiber. Moreover, the reason why the melting point of the crystal portion in the micro organic short fiber is not less than 160° C. is due to the fact that since the temperature of the tire may frequently reach to one hundred and several tens degree in the manufacturing stage as well as the running stage of the tire, when the micro organic short fiber is fused at this temperature and again hardened, the form of the short fiber is modified to produce a risk of losing the desired reinforcing effect.

The amount of the micro organic short fiber added is 3 to 30 parts by weight per 100 parts by weight of rubber. In this case, two or more kinds of the micro organic short fibers as described above may be mixed. When the amount is less than 3 parts by weight, the addition effect is hardly expected, while when the amount exceeds 30 parts by weight, the processability considerably lowers.

The micro organic short fibers can be produced as follows. In case of isotactic-polypropylene short fiber, for instance, powdery isotactic-polypropylene is swollen and crushed in n-hexane at 60° C. to form a slurry, which is then sprayed through a nozzle under a pressure of 90–110 kg/cm² to obtain micro short fibers. These short fibers are again dispersed in n-hexane and mixed with a polymer cement, and thereafter the resulting mixture is stirred and subjected to a drying process used for usual rubber to form a master batch. In this case, the length, diameter and length/diameter ratio of the resulting micro organic short fiber can be changed by controlling the solvent used for swelling, the swelling temperature, the spraying pressure of the nozzle and the like. Moreover, the reason why the micro organic short fibers are made into the master batch is due to the fact that it is relatively easy to uniformly disperse the short fibers in rubber, but the short fibers may directly be mixed with rubber together with usually used additives such as carbon black and the like. Similarly, micro organic short fibers other than the isotactic-polypropylene can be produced in the same manner as described above from the slurry formed by swelling and crushing in a relatively poor solvent. Furthermore, a proper mixture of good solvent and poor solvent may be used as the solvent for swelling.

The diene rubber to be used in the present invention includes at least one rubber selected from natural rubber, polyisoprene rubber, polybutadiene rubber and styrene-butadiene copolymer rubber. In the rubber composition according to the present invention, the reason why the amount of butyl rubber and/or halogenated butyl rubber is limited to not less than 50 parts by weight is due to the fact that when the amount is less than 50 parts by weight, the air permeability becomes considerably higher, which does not meet with the object of the present invention.

When the micro organic short fibers are added to a rubber blend consisting of not less than 70 parts by weight of butyl rubber and/or halogenated butyl rubber and not more than 30 parts by weight of diene rubber, the addition effect can be more developed and also the air permeability can be further reduced.

According to the present invention, it is also essential to use carbon black in an amount of 10 to 100 parts by weight per 100 parts by weight of rubber. When the amount of carbon black is less than 10 parts by weight, the strength at breaking of the resulting rubber composition lowers considerably, while when the amount exceeds 100 parts by weight, the workability is considerably deteriorated. As the carbon black, use may be made of ones usually used in the tire, such as furnace black, channel black and the like.

Moreover, according to the present invention, additives such as vulcanizing agent, vulcanization accelerator, accelerator activator, silica filler, softener and the like may be compounded in usual amounts in addition to the micro organic short fibers and carbon black.

The present invention will now be described in greater detail with reference to the following examples and comparative examples.

EXAMPLES 1-9
COMPARATIVE EXAMPLES 1-28

Thirty seven rubber compositions were produced by kneading a rubber composition consisting of 100 parts by weight of bromobutyl rubber, 50 parts by weight of carbon black GPF, 10 parts by weight of spindle oil, 2 parts by weight of stearic acid and 10 parts by weight of each of 37 micro organic short fibers shown in the following Table 1 in a Banbury mixer at a temperature 155° C. for 5 minutes and further adding 3 parts by weight of zinc white, 1 part by weight of vulcanization accelerator Nocceler DM (trade name of dibenzothiazyl disulfide, made by Ohuchi Shinko Kagaku Co., Ltd.) and 0.3 part by weight of vulcanization accelerator Nocceler TT (trade name of tetramethylthiuram disulfide, made by Ohuchi Shinko Kagaku Co., Ltd.) thereto. For the comparison, there was provided a rubber composition containing no micro organic short fiber. The average rebound resilience and swelling value were evaluated with respect to these rubber compositions as follows.

Swelling value

The swelling value was given by a percentage of a ratio of rubber diameter to orifice diameter when the rubber composition was extruded through a circular orifice having a diameter of 2 mm and a length of 4 mm at 100° C. and at a strain rate of 200 sec$^{-1}$.

Average rebound resilience

The rebound resilience was evaluated by an average value of rebound resiliences measured at 30° C., 60° C., 90° C. and 120° C. according to the method of BS 903 Part 13. However, when the materials of micro organic short fibers are different, even if the compounding recipe is same, the elastic modulus is not always coincident, so that it is difficult to clearly represent the effect of the present invention by simple comparison of respective rubber compositions. Therefore, several rubber compositions were prepared by adding 10 parts by weight of spindle oil, 2 parts by weight of stearic acid, 3 parts by weight of zinc white, 1.0 part by weight of vulcanization accelerator Nocceler DM and variable amount of carbon black GPF to 100 parts by weight of bromobutyl rubber and then measured at 30° C., 60° C., 90° C. and 120° C. with respect to the elastic modulus and rebound resilience. Thereafter, the elastic modulus at each temperature was plotted on an abscissa and the rebound resilience at each temperature was plotted on an ordinate, whereby a master curve was obtained. From these master curves was read out a rebound resilience of the rubber composition reinforced only with carbon black in an elastic modulus corresponding to the elastic modulus of the micro short fiber reinforced rubber composition to be evaluated. Then, the rebound resilience of the micro short fiber reinforced rubber composition to be evaluated at a certain temperature was measured on the basis that the read rebound resilience was 100. The larger the measured value, the better the rebound resilience.

Moreover, the average diameter and average length of the micro organic short fiber were measured as follows: that is, a raw rubber (or rubber composition) containing micro organic short fibers was extruded through a capillary rheometer under conditions of L/D=4, 100° C. and 20 sec$^{-1}$ and then cured in a vulcanizer at 150° C. and 4 kg/cm$^2$ for 1 hour. Thereafter, the vulcanizate was cut in directions perpendicular and parallel to the extrusion direction to form very thin slices, from which were measured the diameters and lengths of micro short fibers contained in the slices by an electron microscope and then the average diameter and average length were calculated according to the following equations:

$$\bar{r} = \frac{\Sigma n_i r_i}{\Sigma n_i}, \quad \bar{l} = \frac{\Sigma n_i l_i}{\Sigma n_i}$$

wherein $\bar{r}$ is an average diameter, $\bar{l}$ is an average length, $r_i$ is a diameter of short fiber, $l_i$ is a length of short fiber, $n_i$ is a number of short fibers having a diameter of $r_i$ or a length of $l_i$ and $\Sigma n_i$ is 300.

TABLE 1(a)

| | | Micro organic short fiber | | | | | | | |
|---|---|---|---|---|---|---|---|---|---|
| | | Material | $\bar{l}$ (μm) | $\bar{r}$ (μm) | $\bar{l}/\bar{r}$ | Glass transition temperature (°C.) | Melting point (°C.) | Rebound resilience | Swelling value (%) |
| Comparative example 1 | Polyolefin | polyethylene | 12 | 0.4 | 30.0 | −125 | 142 | 102 | 117 |
| Example 1 | | isotactic-polypropylene | 10 | 0.3 | 33.3 | −8 | 176 | 123 | 119 |
| Comparative example 2 | | poly-1-butene | 9 | 0.3 | 30.0 | −24 | 130 | 101 | 118 |
| Comparative example 3 | | poly-1-pentene | 10 | 0.35 | 28.6 | −40 | 130 | 102 | 120 |
| Comparative example 4 | | poly-3-methyl-1-butene | 10 | 0.3 | 33.3 | 50 | 300 | 104 | 117 |
| Comparative example 5 | | poly-1-octadecene | 13 | 0.3 | 43.3 | 55 | 100 | 93 | 149 |
| Comparative example 6 | | poly(3-phenyl-1-propene) | 11 | 0.4 | 27.5 | 60 | 208 | 96 | 123 |
| Example 2 | | poly-4-methyl-1-pentene | 12 | 0.4 | 30.0 | 29 | 235 | 129 | 119 |

TABLE 1(b)

| | | Micro organic short fiber | | | | | | |
|---|---|---|---|---|---|---|---|---|
| | | Material | $\bar{l}$ (μm) | $\bar{r}$ (μm) | $\bar{l}/\bar{r}$ | Glass transition temperature (°C.) | Melting point (°C.) | Rebound resilience | Swelling value (%) |
| Comparative example 7 | Polyvinyl compound | isotactic-polyvinyl alcohol | 9 | 0.2 | 45.0 | 85 | 212 | 97 | 116 |
| Comparative example 8 | | polyvinyl chloride | 10 | 0.35 | 28.6 | 81 | 212 | 100 | 122 |
| Example 3 | | polyvinyl naphthalene | 12 | 0.3 | 40.0 | 162 | 360 | 133 | 117 |
| Comparative example 9 | | syndiotactic-polyvinyl alcohol | 11 | 0.35 | 31.4 | 85 | 228 | 95 | 118 |
| Comparative example 10 | | polyvinyl fluoride | 12 | 0.4 | 40.0 | 31 | 200 | 98 | 117 |
| Comparative example 11 | | poly-2-vinylpyridine | 12 | 0.35 | 34.3 | 104 | 212 | 100 | 121 |
| Example 4 | Polyvinylidene | polyvinylidene fluoride | 10 | 0.3 | 33.3 | −50 | 171 | 126 | 119 |
| Example 5 | | polyvinylidene chloride | 11 | 0.25 | 44.0 | −19 | 190 | 127 | 116 |

TABLE 1(c)

| | | Micro organic short fiber | | | | | | |
|---|---|---|---|---|---|---|---|---|
| | | Material | $\bar{l}$ (μm) | $\bar{r}$ (μm) | $\bar{l}/\bar{r}$ | Glass transition temperature (°C.) | Melting point (°C.) | Rebound resilience | Swelling value (%) |
| Comparative example 12 | Polystyrene | polystyrene | 10 | 0.4 | 25.0 | 100 | 240 | 101 | 126 |
| Example 6 | | poly-p-tert-butylstyrene | 11 | 0.3 | 36.7 | 130 | 300 | 130 | 122 |
| Comparative example 13 | | poly-4-methylstyrene | 12 | 0.35 | 34.3 | 93 | 215 | 99 | 123 |
| Comparative example 14 | | poly-3-methylstyrene | 12 | 0.35 | 34.3 | 95 | 265 | 100 | 123 |
| Comparative example 15 | | poly-4-chlorostyrene | 11 | 0.3 | 36.7 | 95 | 265 | 97 | 121 |
| Comparative example 16 | Polydiene | syndiotactic-1,2-polybutadiene | 12 | 0.4 | 30.0 | 40 to 50 | 205 | 95 | 124 |
| Example 7 | | poly-2,3-dimethylbutadiene | 10 | 0.35 | 28.6 | −11 | 192 | 127 | 125 |
| Example 8 | Polycarbonate | poly-bisphenol A carbonate | 9 | 0.4 | 22.5 | 420 | 540 | 129 | 127 |

TABLE 1(d)

| | | Micro organic short fiber | | | | | | |
|---|---|---|---|---|---|---|---|---|
| | | Material | $\bar{l}$ (μm) | $\bar{r}$ (μm) | $\bar{l}/\bar{r}$ | Glass transition temperature (°C.) | Melting point (°C.) | Rebound resilience | Swelling value (%) |
| Comparative example 17 | Polyacrylate | syndiotactic-polyethylacrylate | 9 | 0.25 | 36.0 | −24 | 47 | 101 | 148 |
| Comparative example 18 | | isotactic-polyethylacrylate | 10 | 0.35 | 28.6 | −24 | 47 | 100 | 152 |
| Comparative example 19 | | syndiotactic-polymethylmethacrylate | 12 | 0.3 | 40.0 | 105 | 200 | 95 | 116 |
| Comparative example 20 | | poly-tert-butylacrylate | 11 | 0.35 | 31.4 | 107 | 193 | 98 | 120 |
| Example 9 | Polyether | polyoxymethylene | 10 | 0.35 | 28.6 | −83 | 181 | 133 | 123 |
| Comparative example 21 | | polyoxyethylene | 9 | 0.3 | 30.0 | −41 | 66 | 104 | 154 |
| Comparative example 22 | | polyoxycyclobutane | not shaped into short fiber | | | −75 | 37 | 102 | 150 |

TABLE 1(e)

| | | Micro organic short fiber | | | | | | |
|---|---|---|---|---|---|---|---|---|
| | | Material | $\bar{l}$ (μm) | $\bar{r}$ (μm) | $\bar{l}/\bar{r}$ | Glass transition temperature (°C.) | Melting point (°C.) | Rebound resilience | Swelling value (%) |
| Comparative example 23 | Polyamide | 6-nylon | 10 | 0.3 | 33.3 | 40 to 87 | 220 | 98 | 115 |
| Comparative example 24 | | 6,6-nylon | 10 | 0.25 | 40.0 | 50 | 260 | 99 | 116 |
| Comparative example 25 | | 12-nylon | 11 | 0.35 | 31.4 | 41 | 218 | 100 | 117 |
| Comparative | Polyester | polyethylene terephthalate | 10 | 0.3 | 33.3 | 69 | 260 | 100 | 116 |

TABLE 1(e)-continued

| | | Micro organic short fiber | | | | | | |
|---|---|---|---|---|---|---|---|---|
| | Material | $\bar{l}$ (μm) | $\bar{r}$ (μm) | $\bar{l}/\bar{r}$ | Glass transition temperature (°C.) | Melting point (°C.) | Rebound resilience | Swelling value (%) |
| example 26 Comparative example 27 | polyethylene isophthalate | 10 | 0.25 | 40.0 | 51 | 240 | 100 | 116 |
| Comparative example 28 | polytetramethylene terephthalate | 11 | 0.30 | 36.7 | 80 | 232 | 99 | 118 |
| Comparative example 29 | no short fiber | — | — | — | — | — | 100 | 154 |

As apparent from the data of Table 1, the rebound resilience is considerably improved in the rubber composition according to the present invention wherein the glass transition temperature is less than 30° C. or more than 120° C. and the melting point is not less than 160° C.

EXAMPLES 10-12

Comparative Examples 30-35

Nine rubber compositions were prepared by adding isotactic-polypropylene short fibers having various forms shown in the following Table 2 as a micro organic short fiber to the same compounding recipe as described in Example 1. Then, the roll processability, resistance to crack growth, swelling value, processing hysteresis and uniformity of inner liner after vulcanization were measured with respect to these rubber compositions to obtain results as shown in Table 2. The measurements were as follows.

Roll processability

The presence of roll burr was observed in the kneading with 10 inch rollers. In this case, the absence of roll burr was represented by symbol o, while the presence of roll burr was represented by symbol x.

Resistance to crack growth

In a vulcanized rubber sheet having a width of 5 cm and a thickness of 2 mm was formed a crack having a width of 2 mm at its center, to which was applied a 50% strain at a vibration rate of 300 cycle/min to measure a time required for cutting the rubber sheet. Since this value is also largely influenced by the elastic modulus of rubber, it is evaluated according to the evaluation method for average rebound resilience as described in Example 1 on the basis that the value of the rubber composition having the same elastic modulus and reinforced only with carbon black is 100. The larger the value, the better the resistance to crack growth.

Uniformity of inner liner after vulcanization

After a tire having a tire size of TBR 1000 R20 was shaped and vulcanized so that a thickness of an inner liner was 1.2 mm, the actual thickness of the resulting inner liner was measured to reject ones having the thickness beyond a tolerance of ±0.15 mm with respect to the defined value as an inferior goods. The uniformity was evaluated by the number of inferior goods among ten tires.

Processing hysteresis of short fiber

The average length and average diameter of the micro organic short fibers in a raw rubber were previously measured and then the average length and average diameter of the micro organic short fibers after the preparation of the rubber composition were measured. As a result, the case that the latter values are not less than 85% of the former values was represented by symbol o, while the case that the latter values are less than 85% was represented by symbol x.

TABLE 2

| | | Comparative example 30 | Comparative example 31 | Example 10 | Example 11 | Example 12 | Comparative example 32 | Comparative example 33 | Comparative example 34 | Comparative example 35 |
|---|---|---|---|---|---|---|---|---|---|---|
| Micro organic short fiber | $\bar{l}$ | 1.0 | 0.6 | 0.8 | 5.0 | 29 | 33 | 25 | 28.5 | 5.6 |
| | $\bar{r}$ | 0.01 | 0.04 | 0.02 | 0.08 | 0.8 | 0.6 | 1.2 | 0.07 | 0.8 |
| | $\bar{l}/\bar{r}$ | 100 | 15 | 40 | 62.5 | 36.3 | 55 | 20.8 | 407 | 7 |
| | Maximum diameter | 0.8 | 0.9 | 0.9 | 1.2 | 9.5 | 8.0 | 9.6 | 1.1 | 9.4 |
| Results | Roll processability | o | o | o | o | o | x | o | o | o |
| | resistance to crack growth | 106 | 109 | 183 | 225 | 299 | 180 | 81 | 116 | 94 |
| | Swelling value | 124 | 133 | 115 | 114 | 117 | 115 | 122 | 112 | 141 |
| | Uniformity of inner liner | 1 | 2 | 0 | 0 | 0 | 0 | 1 | 0 | 3 |
| | Processing hysteresis | x | o | o | o | o | o | o | x | o |

EXAMPLES 13-15

Comparative Examples 36-38

Rubber compositions having a compounding recipe as shown in the following Table 3 were prepared and then the roll processability, resistance to crack growth, swelling value and uniformity of inner liner were evaluated with respect to these rubber compositions to obtain results as shown in Table 3.

TABLE 3

|  | Comparative example 36 | Comparative example 37 | Example 13 | Example 14 | Example 15 | Comparative example 38 |
|---|---|---|---|---|---|---|
| Natural rubber | 10 | 10 | 10 | 10 | 10 | 10 |
| Chlorobutyl rubber | 90 | 90 | 90 | 90 | 90 | 90 |
| Carbon black GPF | 60 | 60 | 60 | 60 | 60 | 60 |
| Stearic acid | 2 | 2 | 2 | 2 | 2 | 2 |
| Zinc white | 3 | 3 | 3 | 3 | 3 | 3 |
| Spindle oil | 8 | 8 | 8 | 8 | 8 | 8 |
| Nocceler DM | 0.8 | 0.8 | 0.8 | 0.8 | 0.8 | 0.8 |
| Nocceler TT | 0.15 | 0.15 | 0.15 | 0.15 | 0.15 | 0.15 |
| Sulfur | 1.0 | 1.0 | 1.0 | 1.0 | 1.0 | 1.0 |
| Micro isotactic-polypropylene short fiber used in Example 11 | 1 | 2 | 3 | 10 | 30 | 35 |
| Roll processability | o | o | o | o | o | x |
| Resistance to crack growth | 100 | 103 | 123 | 215 | 235 | x |
| Swelling value | 153 | 129 | 119 | 115 | 112 | 109 |
| Uniformity of inner liner | 4 | 1 | 0 | 0 | 0 | 0 |

In Comparative Example 38, the roll processability is poor, so that it is very difficult to prepare a sample. Now, when carbon black GPF is increased by an amount corresponding to 35 parts by weight of the micro isotacticpolypropylene short fibers, the amount of carbon black becomes excessive to cause the poor dispersion, so that the proper rubber composition for control cannot be obtained.

What is claimed is:

1. A pneumatic tire, characterized by forming an inner liner with a vulcanizate of a rubber composition comprising 3 to 30 parts by weight of micro organic short fibers and 10 to 100 parts by weight of carbon black on a basis of 100 parts by weight of butyl rubber and/or halogenated butyl rubber or a rubber blend consisting of not less than 50 parts by weight of butyl rubber and/or halogenated butyl rubber and not more than 50 parts by weight of diene rubber; said micro organic short fiber consisting of an amorphous portion having a glass transition temperature of less than 30° C. or more than 120° C. and a crystal portion having a melting point of not less than 160° C., and having an average length of 0.8 to 30 μm, an average diameter of 0.02 to 0.8 μm and a ratio of average length to average diameter of 8 to 400.

2. A pneumatic tire according to claim 1, wherein said micro organic short fiber is at least one short fiber made of polyvinylidene chloride, polyvinylidene fluoride, poly-p-tert-butylstyrene, p-chlorostyrene, dichlorostyrene, poly-α-methylstyrene, poly-2-methylstyrene, poly-2,5-dimethylstyrene, polytrimethylstyrene, poly-p-phenylstyrene, poly-o-vinyl benzyl alcohol, isotactic-polypropylene, poly-4-methyl-1-pentene, polyvinylnaphthalene, polyoxymethylene, polybisphenol-A carbonate and 1,4-poly-2,3-dimethyl butadiene.

3. A pneumatic tire according to claim 1, wherein said rubber blend consists of not less than 70 parts by weight of butyl rubber and/or halogenated butyl rubber and not more than 30 parts by weight of diene rubber.

4. A pneumatic tire according to claim 1, wherein said diene rubber is selected from natural rubber, polyisoprene rubber, polybutadiene rubber and styrene-butadiene copolymer rubber.

* * * * *